United States Patent
Mallige et al.

(10) Patent No.: US 9,292,402 B2
(45) Date of Patent: Mar. 22, 2016

(54) AUTONOMOUS SERVICE MANAGEMENT

(71) Applicant: CenturyLink Intellectual Property LLC, Denver, CO (US)

(72) Inventors: Ramapriya Mallige, Bangalore (IN); Santhosh Plakkatt, Bangalore (IN); Manoj Ramchandra, Bangalore (IN); Viswanath Seetharam, Bangalore (IN)

(73) Assignee: Century Link Intellectual Property LLC, Denver, CO (US)

( * ) Notice: Subject to any disclaimer, the term of this patent is extended or adjusted under 35 U.S.C. 154(b) by 289 days.

(21) Appl. No.: 13/863,106

(22) Filed: Apr. 15, 2013

(65) Prior Publication Data

US 2014/0310564 A1    Oct. 16, 2014

(51) Int. Cl.
*G06F 11/00* (2006.01)
*G06F 11/30* (2006.01)
*G06F 11/07* (2006.01)
*G06F 11/34* (2006.01)

(52) U.S. Cl.
CPC ........ *G06F 11/3003* (2013.01); *G06F 11/0706* (2013.01); *G06F 11/0751* (2013.01); *G06F 11/0781* (2013.01); *G06F 11/0793* (2013.01); *G06F 11/3409* (2013.01); *G06F 2201/81* (2013.01); *G06F 2201/865* (2013.01)

(58) Field of Classification Search
CPC ............ G06F 11/0751; G06F 11/0754; G06F 11/076; G06F 11/0769; G06F 11/0781; G06F 11/0784; G06F 11/079; G06F 11/0793; G06F 11/324; G06F 11/327; G06F 11/2257; G06F 11/3409; G06F 11/3447
See application file for complete search history.

(56) References Cited

U.S. PATENT DOCUMENTS

| | | | | |
|---|---|---|---|---|
| 5,944,839 | A * | 8/1999 | Isenberg | 714/26 |
| 6,918,059 | B1 * | 7/2005 | Galuten et al. | 714/31 |
| 7,293,201 | B2 * | 11/2007 | Ansari | 714/38.14 |
| 7,765,436 | B2 * | 7/2010 | Bassin et al. | 714/47.2 |
| 8,108,725 | B2 * | 1/2012 | Chan | 714/26 |
| 9,081,750 | B2 * | 7/2015 | Dake | G06F 11/0709 |
| 2004/0236843 | A1 * | 11/2004 | Wing et al. | 709/219 |
| 2005/0228880 | A1 * | 10/2005 | Champlin | 709/224 |
| 2008/0281607 | A1 * | 11/2008 | Sajja et al. | 705/1 |
| 2009/0172460 | A1 * | 7/2009 | Bobak et al. | 714/2 |
| 2011/0214006 | A1 * | 9/2011 | Meek et al. | 714/2 |
| 2011/0260879 | A1 * | 10/2011 | Avner et al. | 340/679 |
| 2011/0316688 | A1 * | 12/2011 | Ranjan et al. | 340/511 |
| 2012/0239977 | A1 * | 9/2012 | Lamm et al. | 714/25 |
| 2013/0103973 | A1 * | 4/2013 | Werth et al. | 714/2 |
| 2013/0305102 | A1 * | 11/2013 | Malnati | 714/49 |
| 2013/0346786 | A1 * | 12/2013 | Thiel et al. | 714/2 |
| 2014/0122927 | A1 * | 5/2014 | Yildiz | 714/15 |
| 2015/0019724 | A1 * | 1/2015 | Qian et al. | 709/224 |

* cited by examiner

*Primary Examiner* — Marc Duncan

(74) *Attorney, Agent, or Firm* — Swanson & Bratshun, L.L.C.

(57) ABSTRACT

Novel tools and techniques that offer more robust solutions for application service management. Some such solutions provide a service management framework for managing a software application. In some cases, the framework can include multiple tools to detect and/or remedy application problems at a variety of different levels. In another aspect, some solutions can define multiple application lifecycle phases, ranging from minor impairment to catastrophic failure. For each of such phases, the service management framework can define one or more diagnostic criteria and/or one or more corrective actions that can be taken to remedy a suboptimal condition of the application.

19 Claims, 10 Drawing Sheets

US 9,292,402 B2

AUTONOMOUS SERVICE MANAGEMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the field of Information Technology ("IT") service delivery, and more particularly, to tool and techniques for providing autonomous service management for applications.

BACKGROUND

Application service delivery and application availability are two major challenges for maintenance projects for all service-based organizations across the IT industry. This is particularly true with regard to enterprise applications (which can include, without limitation, a number of applications and application suites from vendors such as SAP™, Oracle™, and others, such as enterprise resource planning applications, customer relationship management applications, accounting applications, supply chain management applications, and the like). These large-scale applications are mission-critical for many businesses, and any performance degradation, let alone application outages, can cost an enterprise millions of dollars. For example, one study found that 59% of Fortune 500 companies experience at least 1.6 hours of application downtime per week, which cost each organization around $46 million per year. Another study found that resolution time per application outage averages around 200 minutes. The average reported incident length was 90 minutes, resulting in an average cost per incident of approximately $505,500.

Given the dramatic cost of such application outages, IT organizations have invested heavily in developing monitoring tools around applications, networks, and hardware as preventive measure for application/service outages. The existing monitoring model, however, was designed based on old techniques and requirements, which are not sufficient to fulfill the modern demands arising from growing business environment and their customers.

In today's competitive business environment one cannot keep business critical applications and business services up and running with conventional monitoring tools/approaches that only alert an administrator to problems after performance has already begun to suffer. To prevent service degradations and outages, assure a high quality customer experience, and keep revenue flowing, recognition of the leading indicators of performance problems hours before they go out of control and lead to service outages is vital. Current solutions, however, do a poor job of such recognition. Such solutions generally rely on a monitoring system which alerts administrators to problems only after performance/service already has degraded and the application is approaching an outage situation.

Hence, there is a need for a more robust solution set of application service management. Ideally, such solutions would not only alert service delivery personnel well in advance of significant application impairment but could take automated corrective actions to resolve the problem/incident and prevent potential outages.

BRIEF SUMMARY

A set of embodiments, therefore, provides novel tools and techniques that offer more robust solutions for application service management. Merely by way of example, some embodiments provide a service management framework for managing a software application (e.g., an enterprise application). In some embodiments, the framework can include multiple tools to detect and/or remedy application problems at a variety of different levels. In another aspect, some embodiments can define multiple application lifecycle phases, ranging from minor impairment to catastrophic failure. For each of such phases, the service management framework can define one or more diagnostic criteria and/or one or more corrective actions that can be taken to remedy a suboptimal condition of the application. Using such a framework, the tools and techniques provided by various embodiments can enable a service delivery organization to identify and remedy suboptimal conditions in an application at the earliest possible point, preventing potential downtime and the resulting loss of revenue.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods, including without limitation methods of providing service management for software applications. An exemplary method may comprise implementing (e.g., with the computer) it service management framework to manage a software application. In one aspect, the service management framework can comprise a plurality of components. For instance, in one embodiment, the service management framework might comprise an early warning system, a self-healing system, and/or a subject matter expert intervention mechanism.

Such a method might also comprise monitoring the software application with a computer. In an aspect, the computer might detect that the software application has encountered deterioration of operation. The method might further comprise determining a one of a plurality of pre-defined performance deterioration phases into which the software application has entered. In some cases, the method can include performing, with the computer, one or more actions specified by the service management framework, based on the determination of the pre-defined performance deterioration phase.

In accordance with some embodiments, the wherein the pre-defined performance deterioration phases can comprise an attenuation phase, in which performance of the software application is less than optimal but still the software application remains fully operational. In another aspect, the phases can comprise a degeneration phase, characterized by an anomaly in application service or functionality, and/or a debilitation phase, characterized by partial loss of application service or functionality. In yet another aspect, the phases can include a breach phase, characterized by complete loss of application service or functionality. For each of these phases, the framework might specify one or more criteria for detecting that the application has entered that phase an/or one or more actions to remedy the condition that resulted in such a phase.

In an aspect of some particular embodiments, the service management framework might specify that management of the software application will proceed through the pre-defined performance deterioration phases in a specified order when performance degradation is detected. In some cases, however, the framework will provide flexibility to vary from this specified order when necessary. Merely by way of example, the method might comprise detecting, with the computer, a condition of the software application, and in response to the detected condition, varying management of the software application by proceeding through the pre-defined performance deterioration phases in an order other than the specified order.

Another set of embodiments might software programs. For instance, an exemplary apparatus in accordance with some embodiments might comprise a non-transitory computer readable medium having encoded thereon a set of instructions executable by one or more computers to perform one or more operations for providing service management for a software application. The set of instructions might include, without limitation, instructions for implementing operations in accordance with methods provided by other embodiments.

Merely by way of example, in some embodiments, the set of instructions might include instructions for implementing a service management framework to manage the software application. In an aspect, the framework might comprise an early warning system, a self-healing system, and/or a subject matter expert intervention mechanism. The set of instructions might further include instructions for monitoring the software application and/or instructions for detecting that the software application has encountered deterioration of operation. In some cases, the set of instructions can include instructions for determining one of a plurality of pre-defined performance deterioration phases into which the software application has entered. There might also be instructions for performing, based on the determination of the pre-defined performance deterioration phase, one or more actions specified by the service management framework.

Yet a further set of embodiments might provide systems, including without limitation systems for providing service management for a software application. The application to be managed might run on such a computer system, or it might run on a different system managed by such a system. An exemplary system might include one or more processors and a non-transitory computer readable medium in communication with the one or more processors. The computer readable medium might have encoded thereon a set of instructions executable by the computer system to perform one or more operations, including without limitation, instructions to perform one or more operations in accordance with methods provided by other embodiments, such as the instructions described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
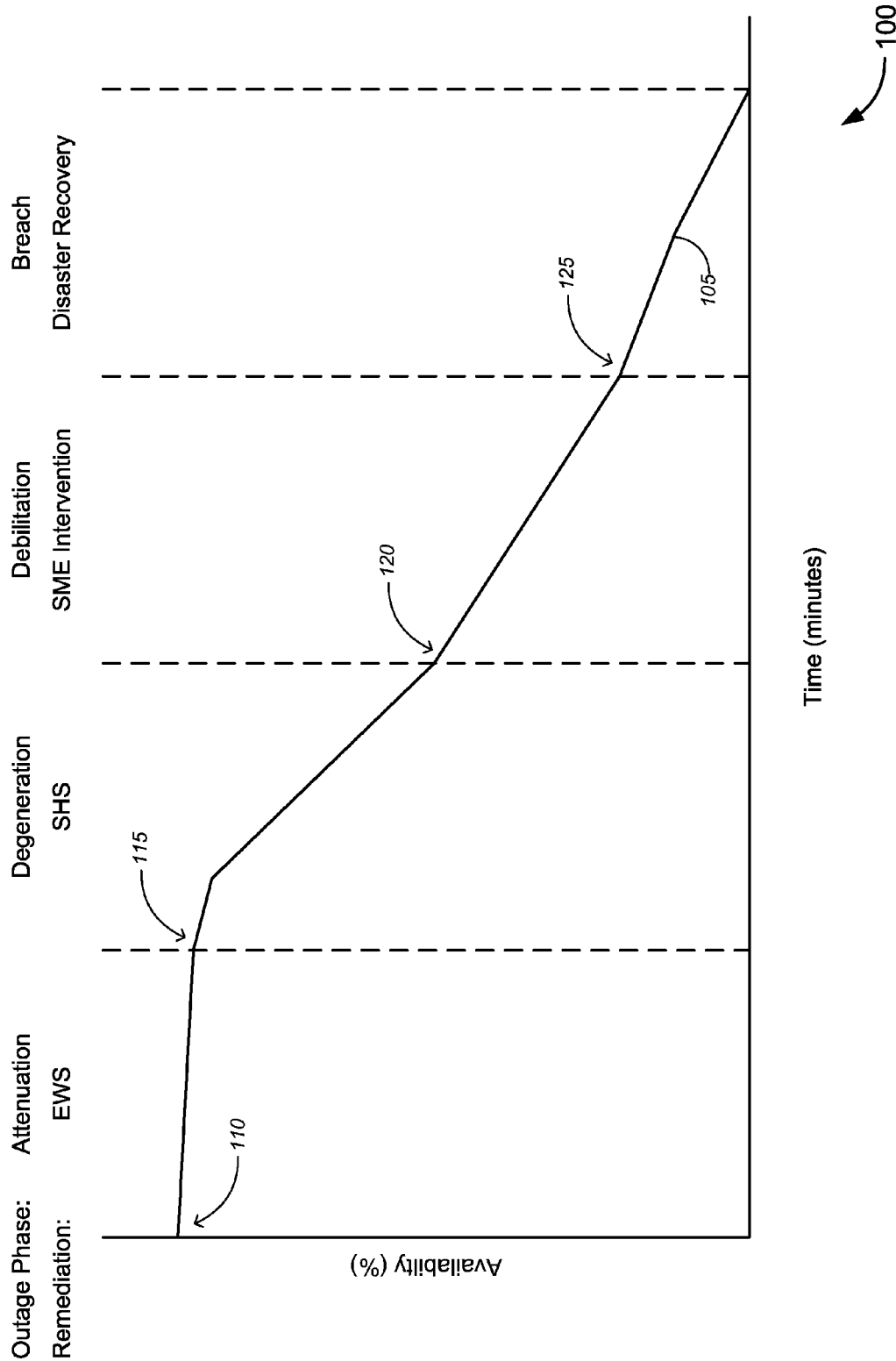
FIG. 1 illustrates an application outage lifecycle, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide novel tools and techniques that offer more robust solutions for application service management. Merely by way of example, some embodiments provide a service management framework for managing a software application (e.g., an enterprise application). In some embodiments, the framework can include multiple tools to detect and/or remedy application problems at a variety of different levels. Merely by way of example, such a framework can include an early warning system to detect potential application issues before a material adverse impact on application operations has occurred. In another aspect, the framework might include a self-healing system, which can provide the ability to correct minor problems before application performance deteriorates substantially. In yet another aspect, the framework can include a subject matter expert intervention mechanism, which can automatically invoke the expertise of a human subject matter expert upon determining that automated correction facilities are ineffective to solve application issues.

In another aspect, some embodiments can define multiple application lifecycle phases, ranging from minor impairment to catastrophic failure. For each of such phases, the service management framework can define one or more diagnostic criteria and/or one or more corrective actions that can be taken to remedy a suboptimal condition of the application. Using such a framework, the tools and techniques provided by various embodiments can enable a service delivery organization to identify and remedy suboptimal conditions in an application at the earliest possible point, preventing potential downtime and the resulting loss of revenue.

To illustrate some of these features, FIG. 1 illustrates a graph 100 illustrating an application outage lifecycle. The plotline 105 represents application availability measured over time. The graph 100 is generalized, and measures of availability and time can correspond to various parameters. For example, the measure of availability might correspond with transactions per second, response time, and/or any other metric by which an application can be measured (as compared with baseline values representing optimal operation of the application). The time axis might be represented by seconds, minutes, etc. depending on the nature of the application. In any event, the graph 100 illustrates progressive deterioration of application performance over time, until catastrophic failure (outage), represented by the point where the plotline 105 meets the horizontal axis of the graph 100.

We have recognized that the application outage lifecycle can be organized into a number of different phases. In an aspect, each of the phases can be characterized by application characteristics that define the phase and by remedial solutions that can be implemented during that phase. Merely by way of example, FIG. 1 illustrates four such phases. Prior to discussing such phases in detail, however, it is helpful to introduce an exemplary service management framework that can be implemented to address each of these phases.

Figure 2A:
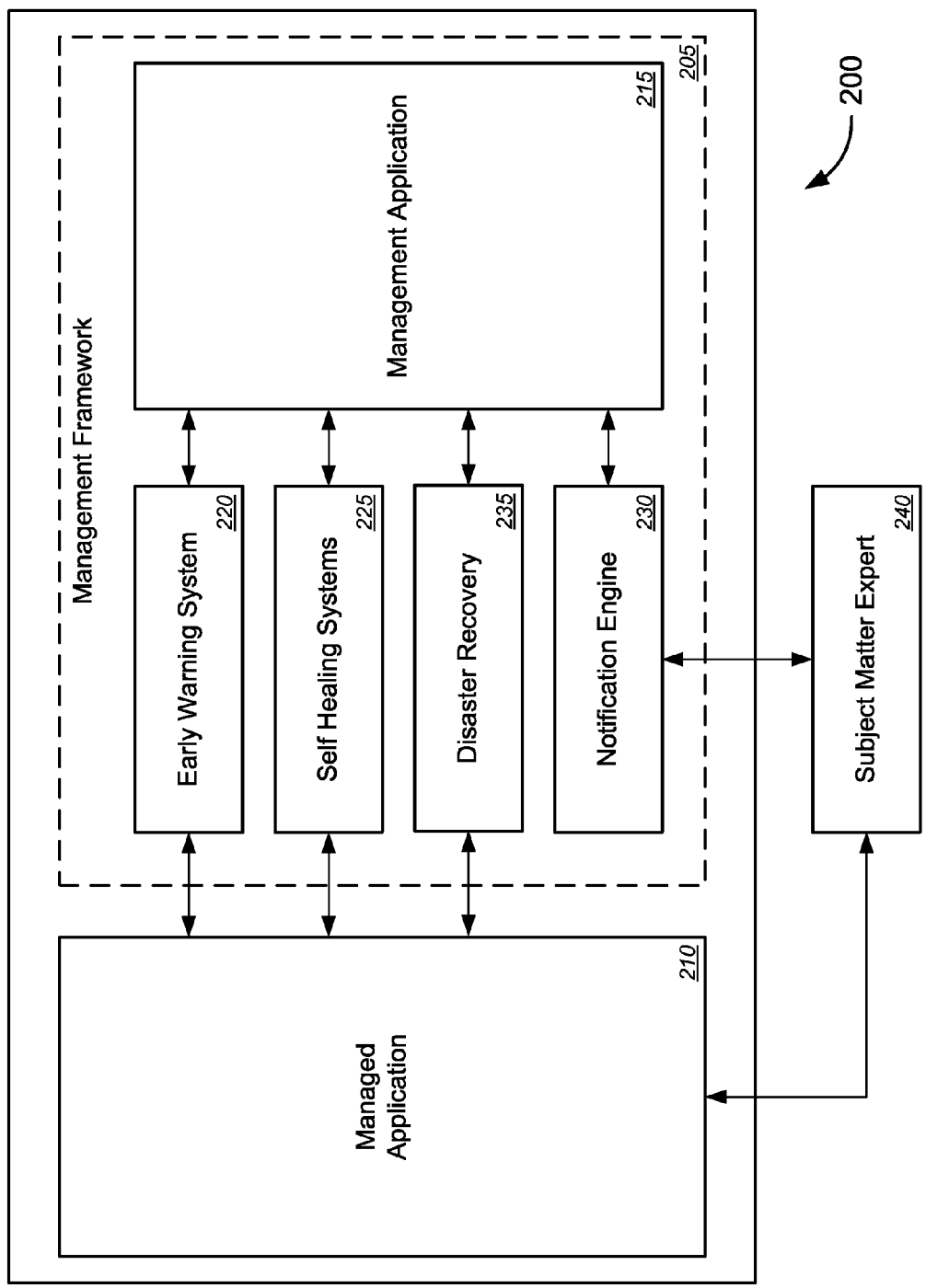
FIGS. 2A and 2B are functional diagrams of systems for providing service management for a software application, in accordance with various embodiments.

Hence, FIG. 2A illustrates a service management system 200 that can provide service management for a software application. In the illustrated embodiment, the system 200 provides a management framework 205 for managing a managed application 210, which might be an enterprise application (as described above) or any other suitable application. As illustrated, the management framework 205 can include a management application, which is responsible for overall service management of the managed application 210 and coordination various other components of the framework 205. Thus, in an embodiment, the management application 215 can perform some or all of the diagnostic an decision-making functionality described further below, based on input received from other framework components, and/or can initiate corrective actions to be performed by other framework components, also is described in further detail below. In some embodiments, the management application 210 might be a discrete application; in other embodiments, the functionality of the management application 210 can be performed collectively by other components, such that no discrete management application 210 is necessary.

Such other components can include, without limitation, an early warning system 220, which can be employed by the framework 205 to monitor the managed application 210 and quickly identify any performance problems that might indicate the beginning of an outage lifecycle. Thus, the early warning system 220 can provide timely surveillance of impending/potential issues in the production environment. In an aspect, the early warning system 220 can provide decision-making input to the management application 210 and can identify check early degradation, thereby giving valuable time in detection of undesirable situations leading to outage. In an aspect, the early warning system 220 can help to minimize the duration between the issue occurrence and issue detection as much as possible, this can provide additional time to leverage in subsequent phases for problem investigation and resolution.

The early warning system 200 might be configured to monitor some or all components of the managed application 210 and/or its underlying infrastructure (e.g., application server, database server, web server, etc.), such as file systems, processes, web services, logs, transactions, database components, early bird functionality testing, and the like, using advanced tools and/or scripts. Merely by way of example, the early warning system 220 might provide sanity monitoring of the application 210 processes and/or network events. The early warning system 220 might also employ threshold monitors, which can compare current monitoring statistics with baseline values (which might be stored in a knowledgebase or issue repository).

In an aspect, the early warning system 200 can include and/or employ a variety of monitoring tools, which can include any of a number of tools designed to measure application performance and/or availability. Such tools necessarily can vary based on the nature of the managed application 210. Merely by way of example, in a database environment, a monitoring tool employed by the early warning system 220 might monitor the application 210 for any long running queries, which could indicate compromised application performance before any true application failures become apparent. As another example, in a transaction-processing application, the early warning system might include tools that monitor the size of a transaction queue; a build up in the transaction queue might indicate reduced processing capability of the application and/or the underlying hardware.

In response to detecting any performance degradation condition, the early warning system 220 can take a number of different actions, depending on the embodiment and on the condition detected. Merely by way of example, the early warning system 220 might automatically log an alert the management application 210 in each detected instance of compromised performance. In some cases, the early warning system 220 might alternatively and/or additionally provide a trigger to another component, such as the self-healing system 225, described below, and/or alert the support team for further actions. Merely by way of example, depending on the severity of the condition detected, the early warning system 220 might log the detection, send an alert to the management application 210, trigger a self-healing system 225, or send an alert directly to a subject matter expert. In some cases, the early warning system 220 might include process, functional, and/or event monitors, and/or the early warning system 220 can include self-check routines to ensure compliance and functionality based on pre-defined monitoring scope.

The service management framework 205 might further comprise one or more self-healing systems 225, which can perform automated analysis and/or resolution of the problem. In various aspects, a self-healing system 225, which might be part of the managed application 210 or might be separate therefrom, can be configured to examine, find, diagnose and/ or act on the anomalies that are detected in the managed application 210, for example based on alerts provided by the early warning system 220. In another aspect, a self-healing system 225 can monitor failures, evaluate constraints and/or apply appropriate corrections based on the expected normal behavior.

A self-healing system 225 can employ a variety of tools to accomplish these tasks. In some cases, the self-healing system 225 can include (or employ) behavioral monitors that use pattern heuristics and models of abnormal behaviors to identify anomalies, e.g., through pattern recognition, behavioral monitoring, etc. Merely by way of example, some error scenarios have unique behavior patterns associated therewith; in some embodiments, such patterns can serve as a signature for associated error scenarios, and a self-healing system 225 can trigger an appropriate action based on a mapping between an error scenario and an event-resolution technique.

Alternatively and/or additionally, a self-healing system 225 could use filters and/or analysis tools (such as symptoms databases, knowledgebases, etc.) to identify application conditions based on detected statistics. In some cases, a self-healing system 225 will employ event handlers and/or fault handlers (e.g., internal to the managed application 210) to identify application problems, and the self-healing system 225 can also use executors and/or exception handlers to attempt service restoration. Using these and other tools, the self-healing system 225 can attempt to remedy a variety of problems, such as stalled processes, insufficient disk space, and other performance degradation conditions. If the self-healing system 225 determines that an application problem is one that cannot be fixed by the self-healing system 225 (either based on the diagnosis or based on the failure of an attempted remedy), the self-healing system 225 can take other actions, such as informing the management application that a subject matter expert should be notified (or performing such a notification itself).

Merely by way of example, in some embodiments, a monitoring API within a self-healing system 225 might detect a potential disk usage threshold breach and initiate an appropriate disk clean program based on the relevant signature ID. Once the cleaning program completes, the API might again check to see if utilization is below threshold, and if so, transmit a notification to indicate completion of the resolution. In the eventuality that these routines have failed to push the problem below threshold, a notification (with suitable directives) to Subject Matter Expert might be triggered, as described further below.

Hence, the service management framework 205 might also include a notification engine 230 (which, as noted above, can be relatively separate and/or relatively integrated with other components). The notification engine 230, in various aspects, provides notification services among various components of the management framework 205 and/or provides notification between such components (e.g., the management application 215, the early warning system 220, one or more self-healing systems 225, etc.) and one or more outside entities. Such outside entities can include, without limitation, other service management systems, service level agreement ("SLA") tracking systems, administrative personnel, and/or the like. In an aspect, the notification engine 230 can be used to transport alerts and workflow details between different phases of the framework. Such alerts and workflows can be triggered at certain intervals and, based on the appropriate inputs, will either notify the subsequent phase and/or can be configured to send out notifications (e.g., messages, pages) to subject matter experts or other support personnel with different severity levels The notification engine 230 can provide a variety of different types of notification, depending on the subject of the notification and/or the entity to whom the notification is provided. Merely by way of example, for notification among components of the framework 205 or with outside applications, the notification engine might employ an application programming interface ("API") for such notifications and/or might employ other machine to machine medication techniques, such as XML communications, messaging buses, and/or the like. When providing notification to humans (e.g. subject matter experts 240), the notification engine can employ different techniques. In some cases, the notification engine 230 might provide data to be displayed in a dashboard application for a subject matter expert 240 or another administrator. In other cases, the notification engine 230 might cause the dashboard to display alerts or otherwise highlight the fact that an abnormal application condition has been detected (e.g., through use of color, highlighting, and/or the like). Alternatively under additionally, the notification engine 230 might generate and/or transmit one or more messages (e.g., electronic mail messages, text messages, short message service ("SMS") messages, pager messages, and/or the like to notify a subject matter expert 240 that intervention is required.

In some embodiments, a particular type of outside entity is a subject matter expert 240. In an aspect, a subject matter expert 240 can be a human being, such as high-level applications support personnel, who is trained at problem solving with regard to the managed application 210. Although the service management framework 205 is designed to automate as much of the service management process as possible, there are particular instances in which human interaction may be required. Thus, the framework 205 accommodates this necessity and provides the facility to integrate human expertise with the automated process described herein. In particular, the service management framework 205 maintains overall responsibility for service management for the application 210, and the involvement of a subject matter expert 240 can be considered a single manual step in the automated process. Subject matter expert 240 intervention can ensures that issues cascaded from the previous stages are corrected manually. This stage can also be used for providing much needed workaround information and/or time estimates on problem resolutions to clients/business partners. Failover techniques and multiple way of getting data for critical applications or services are important for service restoration, and these steps often are best implemented manually. Intervention of a subject matter expert 240 can also help in isolation of problems, and application of corrective actions, outside the scope of the automated tool, to bring the application to stable state. Merely by way of example, in some cases, network reconfiguration might be necessary, and the service management framework 205 might not have the required facilities or access permissions to implement such reconfiguration.

Thus, subject matter expert 240 intervention can feature a number of activities. Such activities can include, without limitation, problem management (including problem classification, isolation, resolution, and/or recording), configuration of the management framework 205 and/or managed application (such as reconfiguration of monitoring or alarm settings, implementation of scripting workarounds or fixes), and communication or impact notification to clients and other affected entities. The subject matter expert 240 can also perform root cause, which can provide support teams with teams direction to add additional monitors are improve the existing monitoring systems to prevent future events from progressing to the same level of severity. The subject matter expert might maintain knowledgebases and/or other documentation to allow for quick resolution at this stage.

In some embodiments, the service management framework 205 can also include one or more disaster recovery solutions 235, which can be implemented when all other attempts at problem resolution have failed, and/or when the application 210 is in danger of suffering catastrophic failure. An automated disaster recovery solution 235 can help to recover the impacted system/application 210 and/or at least provide for a workaround until the issue has been completely resolved, so that business continuity can be ensured. Automated disaster recovery solutions 235 that can be implemented by the service management framework 205 in accordance with various embodiments can include load balancing and/or failover solutions, in which the application 210 runs one more than one system. In such a case, if there is a problem with one system (or, in the failover context, with the primary system), the application 210 can continue operation on a backup system, or another system in the load balancing group.

Another type of disaster recovery solution 235 that can be implemented might is a backup and restore solution. Such a solution can take different forms. Merely by way of example, in some cases, data and/or configuration files can be backed up or synchronized as a background process during normal application 210 operation. During the outage situations or as and when required, such data and configuration files can be quickly migrated to backup hardware, which then can be presented to clients and interfacing systems to maintain continuity while hardware or software repairs are made to the primary system. Automation of this process can ensure minimal downtime, and the service management framework 205 can automate this process and initiate the process at the earliest possible time.

In other cases, a corrupted configuration file might be the cause of the application performance degradation. To account for such cases, the service management framework 205 can make continual or periodic backups of configuration files. In the event of an outage, the framework 205, as part of the disaster recovery solution 235, can automatically revert the application 210 to a set of last known good configuration files, which may remedy the outage quickly and with minimal business impact.

In an aspect, the system 200 might comprises a user interface (not shown on FIGS. 2A and 2B), which can allow users (e.g., subject matter experts 240, other service delivery personnel, etc.) to interact with the computer system 200. Thus, in an aspect, when this document describes user interaction (e.g., providing information or notifications to a user, receiving input from a user), the user interface (perhaps in conjunction with the notification engine 230) can be the vehicle for such interaction.

A variety of user interfaces may be provided in accordance with various embodiments, including without limitation graphical user interfaces that display, for a user, display screens for providing information to the user and/or receiving user input from a user. Merely by way of example, in some embodiments, the computer system 200 (or a component thereof, such as the management application 205, the notification engine 230, etc.) may be configured to communicate with a client computer (not shown on FIGS. 2A and 2B) via a dedicated application (such as a dashboard application) running on the client computer; in this situation, the user interface might be displayed by the client computer, based on data and/or instructions provided by the computer system 200 (or component thereof). In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user computer and/or might be served by a web server (not shown on FIGS. 2A and 2B). In various embodiments, the computer system 200 might comprise the web server and/or be in communication with the web server, such that the computer system 200 provides data to the web server to be incorporated in web pages served by the web server for reception and/or display by a browser at the user computer.

It should be appreciated that the system 200 can be implemented in a variety of different hardware and/or software configurations. For example, in the embodiment illustrated by FIG. 2A, the management framework 205 and the managed application 210 execute on the same computer system 200, which might be an application server, another type of server, a virtualized environment, or any other computer environment suitable for running the managed application 210. As illustrated on FIG. 2B, however, in some cases, the management framework might run on one (or more) separate management computer system(s) 205, while the managed application 210 might execute on a different production computer system 245. It should be noted, as well, that either of the computer systems 205 or 245 could comprise a plurality of computers, some or all of which might be physical or virtualized. Merely by way of example, the managed application 210 might run on a group of computers (such as a clustered computer system, a grid computer system, a cloud computer system, and/or the like) and/or might run inside one or more virtual machine ("VM") environments on a single machine or on any such group of computers. Likewise, the functionality of the management framework 205 can be implemented across multiple computers, grid computing environments, cluster computing environments, cloud computing environments, VM environments, and/or the like.

Figure 2B:
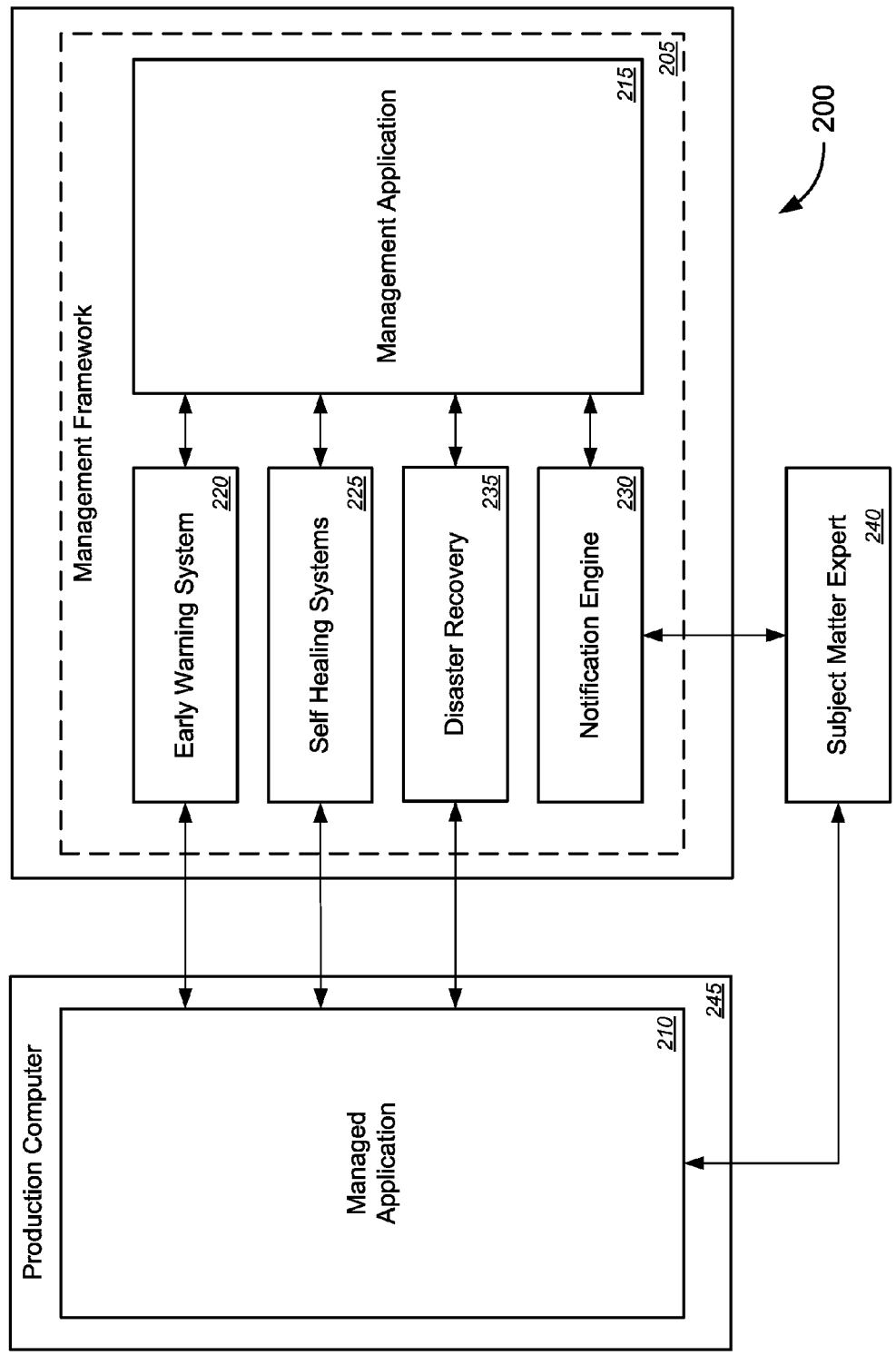

Moreover, certain components of the management framework 205, such as the management application 215, the notification engine 235, etc. might run on a first computer, while other components, such as monitoring tools 220, self-healing systems 225, disaster recovery solutions 230, and the like might run on one or more other computers. In other embodiments, some of the functionality of the management framework 205 may be implemented on one computer system (e.g., a management computer), while other components might execute on the same production computer system on which the managed application 210 operates. Hence, it should be appreciated that FIGS. 2A and 2B are intended to be illustrative of the functionality of various embodiments and should not be considered architecturally limiting.

Returning to FIG. 1, as noted above, the application outage lifecycle has been divided into four phases. The first phase, described herein as the attenuation phase, is characterized by an early dip in application performance, and is indicated on FIG. 1 by 110, where availability declines from 100%. During this phase, however, the application 210 remains generally available and operational, such that traditional monitoring techniques might not register any problem in the operation of the application 210. With the service management framework 205, however, the early warning system 220 can detect a condition indicating suboptimal application performance through the monitoring operations described above and can generate appropriate notifications and/or alerts.

The second phase of the application outage lifecycle is described herein as the degeneration phase, and it begins when the system detects an anomaly in the service or functionality of the application 210; this anomaly might rise above the level of merely off-baseline metrics but might not have a substantial impact on overall application 210 functionality. Detection of an anomaly can occur in a variety ways. In some cases, the service management framework 205 might set an alert threshold, such that a sufficient number of alerts received from the early warning system 220 can indicate a condition (i.e., an anomaly) that indicates the application 210 has entered the degeneration phase. In other cases, a single event of sufficient severity (e.g., a transaction queue larger than the specified threshold, a response delay longer than a specified threshold, etc.) can indicate such an anomaly. In such cases, the service management framework 205 might specify that one or more self-healing systems 225 should be activated to perform analysis, diagnosis, and/or attempted resolution of the detected anomaly. In a particular embodiment, the early warning system 220 might provide alerts directly to the self-healing system 225, which can determine whether a condition exists that indicates that the application 210 has entered the degeneration phase. In other cases, the management application 215 might receive such alerts and make such determination, thus invoking the self-healing system(s) 225 upon making such a determination.

If a self-healing system 225 diagnoses a condition that it cannot repair, or if it attempts to repair a diagnosed condition and fails, the system management framework 205 might specify that the application 210 has reached the third phase of the application outage lifecycle, the debilitation phase. This phase is marked on the graph 100 of FIG. 1 with the point 120, and it can be characterized by partial loss of application functionality or service delivery (especially in cases in which the self-healing system(s) 225 are unable to remedy this condition). In the debilitation phase, subject matter expert 240 intervention might be required. As noted above, a subject matter expert 240 often will have the resources to correct problems outside the scope of the self-healing system(s) 225 or the service management framework software 205 generally. In some cases, upon detecting entry into the debilitation phase, the management application 210 (or a self-healing system 225 itself will provide a notification to subject matter expert 240 (either through the notification engine 230 or using similar techniques) that intervention is necessary. The subject matter expert 240 can attempt problem resolution using various techniques (including without limitation those described above) and/or provide notification to clients, business partners, etc. and/or through an escalation chain. The subject matter expert 240 might also implement SLA variance procedures at this point (although such procedures, such as generation of required notifications and action plans, also could be performed by the service management framework 205, either autonomously or based on input from the subject matter expert 240). The subject matter expert 240 might also engage in root cause analysis during this stage, and/or can initiate any necessary reconfiguration of the service management framework 205 (e.g., monitoring or alarm thresholds for the early warning system 220, actions to be taken by self-healing systems 225, etc. to detect or address similar problems in the future) and/or the application itself (e.g., configuration changes to prevent similar problems in the future).

The fourth phase of the application outage lifecycle is the breach phase, marked by point 125 on the graph 100 of FIG. 1. This phase can be characterized by substantially complete loss of application 210 services or functionality (or a significant component thereof). At this point, the system management framework 205 specifies that any available action should be taken to restore application 210 functionality, including implementation of temporary fixes and/or disaster recovery solutions 235 (including without limitation those described above). In some cases, such solutions can be deployed autonomously by the system 200 (and/or components thereof), while in other cases, such solutions might involve subject matter expert 240 interactions.

Figure 3:
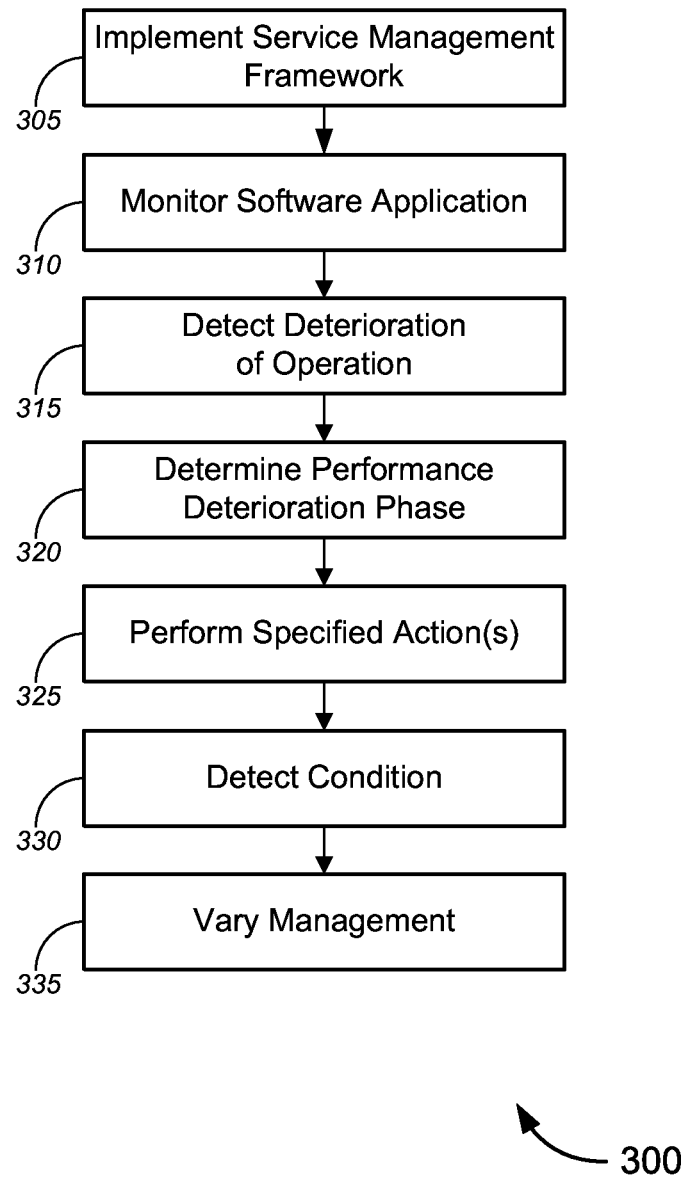
FIGS. 3-7 are process flow diagram illustrating methods of providing service management for a software application, in accordance with various embodiments.

FIGS. 3-7 illustrate various methods that can be used to provide autonomous service management for applications. FIG. 3 illustrates a generalized method of providing service management for a software application, while FIGS. 4-7 illustrate various techniques that can be employed in various implementations. While the methods of FIGS. 3-7 are illustrated, for ease of description, as different methods, it should be appreciated that the various techniques and procedures of these methods can be combined in any suitable fashion, and that, in some embodiments, the methods depicted by FIGS. 3-7 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 3-7 can be implemented by (and, in some cases, are described below with respect to) the system 200 of FIGS. 2A and 2B (or components thereof), these methods may also be implemented using any suitable hardware implementation. Similarly, while the system 200 of FIGS. 2A and 2B (and/or components thereof) can operate according to the methods illustrated by FIGS. 3-7 (e.g., by executing instructions embodied on a computer readable medium), the system 200 can also operate according to other modes of operation and/or perform other suitable procedures.

The method 300 of FIG. 3, as illustrated, comprises implementing a service management framework (block 305). The framework described above with respect to FIGS. 2A and 2B represents one example of a framework that can be implemented by various embodiments. That exemplary framework might include one or more early warning systems, one or more self-healing systems, and/or a subject matter expert intervention mechanism, which can be used to initiate intervention by a subject matter expert when necessary. In some cases, a management application can provide coordination and overall control between these various components. This exemplary framework should not be considered limiting; other frameworks are possible as well.

In an aspect of certain embodiments, the framework is implemented as software executing on a computer system. The framework might include separate software modules for providing various functionality, or the framework might be embodied by a monolithic application. As noted above, the architecture of such a framework, and its architectural relationship to the monitored application, can vary by implementation.

At block 310, the method 300 comprises monitoring a software application. As noted above, a variety of techniques and tools can be used within a service movement framework for monitoring an application. In some cases, for example, monitoring could be performed by an early warning system. In other cases, more advanced monitoring and/or analysis might be performed by other components, such as a self-healing system. As illustrated by block 320, the method 300 can further comprise detecting that the software application has encountered deterioration of operation, for example, based on the results of the monitoring and/or analysis operations. As used herein, the term "deterioration of operation," can mean any condition that indicates that the managed application is not functioning and/or servicing requests optimally. Such degradation can correspond to any of several phases of an application out of lifecycle, as described in further detail below.

The method might further comprise determining which one of a plurality of pre-defined performance deterioration phases (e.g., application outage lifecycle phases) into which the software application has entered (block 320). As noted above, in a non-limiting example, such phases can include an attenuation phase, in which performance of the software application is less than optimal but still the software application remains fully operational; a degeneration phase, which might be characterized by an anomaly in application service or functionality; a debilitation phase, which might be characterized by partial loss of application service or functionality; and/or a breach phase, which might be characterized by complete loss of one or more components of application service or functionality. Depending on the embodiment and/or the phase of the application outage lifecycle, a number of different factors can plan to the determination of which phase the application has entered.

Based on this determination, the method 300 can further include performing one or more actions specified by the service management framework (block 325). As described above, and in further detail below, a number of different actions might be specified by the service management framework, depending on the nature of the detected condition and/or the performance deterioration phase in which the managed application finds itself. In any event, the actions performed by the system will be designed to analyze and/or remedy the condition(s) that have caused the degradation in application performance.

As noted above, in many instances, one strength of the service management framework is the systematic progression through various phases of the application outage lifecycle to produce a resolution; as such, the service management framework might specify that management of the software application should proceed through the pre-defined performance deterioration phases in a specified order when performance degradation is detected. In some cases, however, the nature of the anomaly might dictate variance from this progression. Hence, in an embodiment, the method 300 can comprise detecting particular condition of the software application (block 330), and, in response to such a condition, varying management of the software application by proceeding through the pre-defined performance deterioration phases in an order other than the specified order (block 335).

Merely by way of example, if application monitoring in the attenuation phase indicates catastrophic failure of the managed application, the system might bypass the resolution steps of the degeneration and debilitation phases and proceed directly to quick fixes and/or disaster recovery solutions specified for the breech phase. As another example, if analysis of application anomaly in the degradation phase indicates that the anomaly has resolved (for whatever reason), or if actions taken by subject matter expert in the debilitation phase provide at least partial resolution of the condition, the application deterioration phase might be downgraded to attenuation, rather than proceeding through further stages of remediation. Based on these examples, one skilled in the art can ascertain that flexibility in the progression through application outage lifecycle phases can provide a key benefit of certain embodiments.

Figure 4:
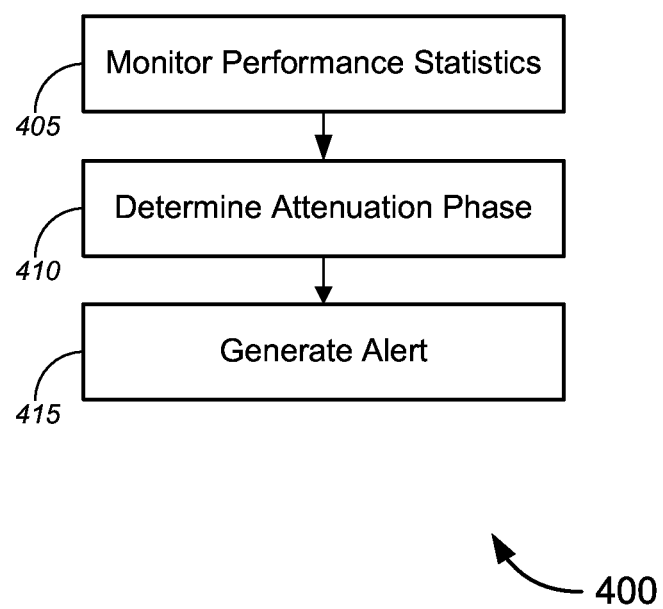

To provide a few non-limiting examples of diagnostic and/or remediation operations that might be appropriate in various phases, FIGS. 4-7 illustrates procedures that might be specified by a service management framework for implementation in various phases of an application outage lifecycle. For instance, FIG. 4 illustrates a method 400 that might be performed with regard to the attenuation phase. The method 400 comprises monitoring the application (e.g., with an early warning system and/or one or more monitoring components thereof) (block 405). As noted above, there are a variety of tools and monitoring techniques that can be employed by the early warning system for this purpose, and depending on the embodiment and the nature of the managed application, one or more of a variety of monitoring tools might be used to monitor the application. Sample rates of monitoring tools can vary as well, depending on the statistic being monitored, and/or the embodiment. Some statistics might be sampled multiple times per second, while others might be sampled on longer intervals (e.g., once per second once every 10 seconds, once per minute, etc.).

At block 410, the method 400 comprises detecting or determining that the application has encountered a condition indicating that the application is entered the attenuation phase. In some cases, this determination can be made based on comparison of one or more monitored statistics of the application with baseline statistics that indicate normal operation of the application. In other cases, the determination can be made based on the monitoring itself, without regard to any baseline statistics (for example in cases where statistics obviously indicate problems with the application, such as communication timeouts and/or the like). A variety of thresholds can be used to determine whether the measured statistic indicates a problem; merely by way of example, in some cases a statistic might be sampled for single iteration before determining that a problem exists, while in other cases, the early warning system might wait to collect a specified number of anomalous samples before determining that the application is entered the attenuation phase.

In some embodiments, the method 400 further comprises generating one or more automatic alert notifications (e.g. with the early warning system), in response to detecting that the software application has encountered a condition that indicates the application has entered the attenuation phase. In some cases, the early warning system might send a single alert notification each time a statistic sample (or group of samples, as the case may be) indicates the detected condition. In such embodiments, for example, the number of alerts generated by the early warning system can provide an indication of whether problem is transient or as an indicator of a more serious issue. As noted below, an alert (or multiple alerts) can be used as a trigger for other components and procedures, and/or as an indicator that the application outage lifecycle has proceeded beyond the attenuation phase. Alternatively and/or additionally, depending on the nature of the monitored statistics and/or the severity of the measured values of those statistics, the early warning system might provide an indicator to the management application (or self-healing system, etc.) of advancing degradation directly, rather than merely producing alerts. The early warning system might take other actions as well, such as logging monitors statistics (whether or not such statistics indicate an anomalous condition), and/or the like.

Figure 5:
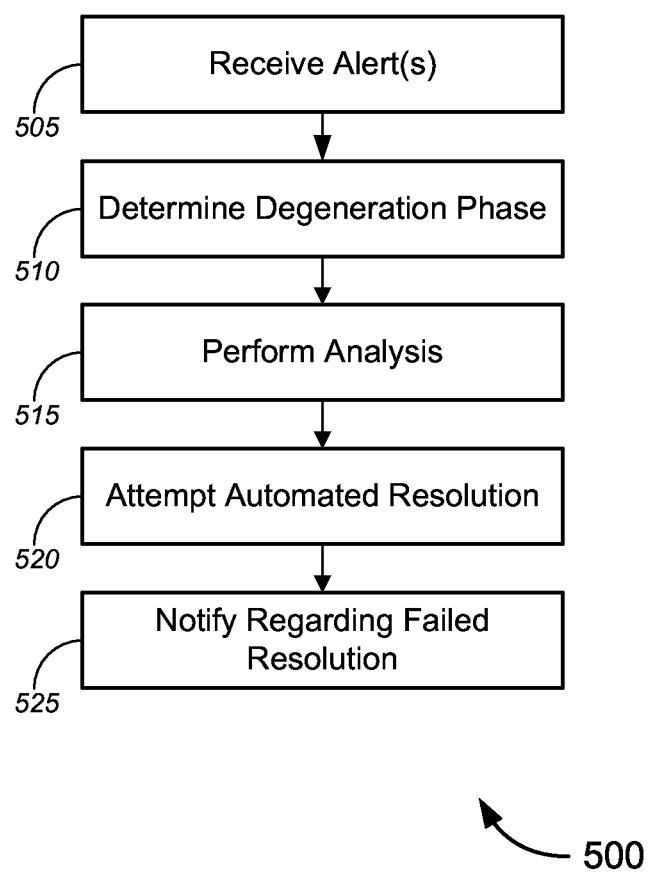

FIG. 5 illustrates a method 500 that can be performed (e.g., by a management application, self-healing system, or other appropriate component of it service management framework) in relation to the degeneration phase of the application outage lifecycle. At block 505, the method 500 comprises receiving one or more alerts (e.g., from an early warning system). Such alerts can be received in a variety of ways, as described above, and can be received at different components, such as a management application (if the embodiment includes such an application) and/or at a self-healing system.

At block 510, the methods that hundred comprises determining that the application has entered the degradation phase. Such a determination can be based on a number of different factors. Merely by way of example, in some cases, a number and/or frequency of received alerts can form the basis of such a determination. In other embodiments and/or situations, however, such a determination might be made independent of the number and/or frequency of alerts received. For instance, if the early warning system detects a severe anomaly when monitoring the application, the early warning system, rather than merely providing alerts, might send a notification directly indicating that the application has entered the degradation phase. Other factors can be considered as well in making such a determination.

At block 515, the method 500 might comprise performing an automated analysis of the detected condition. As noted above, a self-healing system might be used to perform such a task, and a variety of techniques (for example, as described above) can be used to analyze the detected condition. Based on the analysis of the condition, the self-healing system (or other component) might determine that the condition is one that is susceptible to resolution by the self-healing system. In performing this analysis and/or determination, the self-healing system (or management application or other component) might employ various pattern recognition and/or behavioral monitoring techniques, and/or might search knowledge bases, issue databases, and the like to facilitate identification of the condition and/or possible solutions to the problem.

If the system determines that the condition possibly can be solved by a self-healing system, the self-healing system, at block 520, will attempt an automated resolution of the condition (e.g., using techniques such as those described above). If the automated resolution successfully corrects the condition, the status of the application returns to normal, and the service management framework can return to monitoring the application for future problems. The system might also update any knowledge bases or issue databases to indicate the detective condition and the operations performed to produce a successful resolution of the problem.

If, however, the self-healing system cannot successfully resolve the condition, or if it is determined (e.g., by the self-healing system, by the management application, etc.) that the condition is not one that is susceptible to resolution by automated processes such as the self-healing system, the method 500 can include providing a notification that the condition cannot be corrected autonomously, and/or that the application is entered the debilitation phase (block 525), so that other remediation techniques specified by the service management framework can be implemented.

Figure 6:
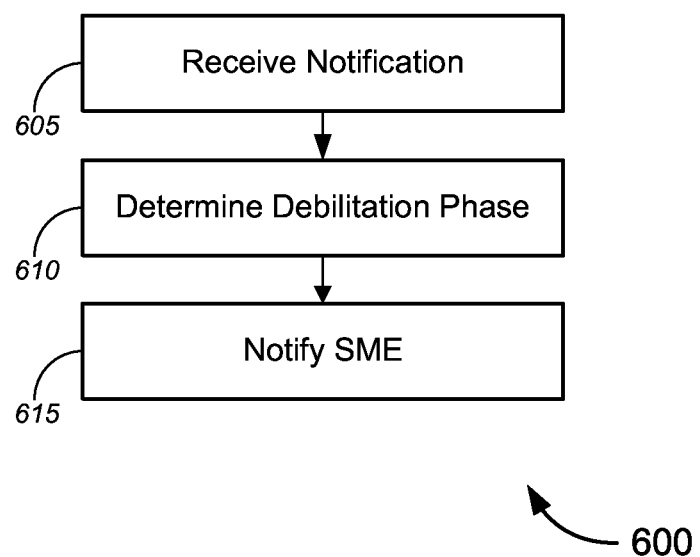

FIG. 6 illustrates A method 600 that can be implemented with regard to the debilitation phase. At block 605, the method 600 can comprise receiving a notification that a self-healing system (or other automated remediation technique) cannot remedy the detected condition. At block 610, the system (or a component thereof) determines that the managed application has entered the debilitation phase. This determination can be based on a number of different factors. Merely by way of example, in some cases the notification that the self-healing system was unable to resolve the problem can, by itself, service the basis for such a notification. In other cases, detection of the continued existence of the condition (or of another condition) causing application impairment after attempted resolution by the self-healing system (even if the failure was reported) can serve as a trigger to aid in the determination that the application is under the debilitation phase. Other factors might be considered as well in producing such a determination. (In some cases, the notification that determination operations can be implicit and/or omitted; for example, a self-healing system or management application might directly notify a subject matter expert upon determining that the self healing system was unable to fix the problem with the managed application.)

In an aspect of some embodiments, upon determining that the managed application is entered the debilitation phase, the method 600 can include notifying a subject matter expert that intervention by the subject matter expert is necessary to address the continued performance degradation of the managed application. As noted above, a variety of notification techniques can be used to accomplish this. Merely by way of example, in some cases, a notification engine can be used as the vehicle for providing such notifications, and the notification engine can include a list of preferred notification techniques for notifying a subject matter expert. To name a few examples, notification can include displaying notification on a dashboard application, transmitting a message to be received by the subject matter expert, and/or the like. Upon receiving the notification, the subject matter expert can intervene to perform advanced troubleshooting, root cause analysis, necessary communications with outside parties, and/or the like (for example, as described above).

In accordance with certain embodiments, a single subject matter expert (or group of experts) might be appropriate to notify for any deterioration condition in the managed application. In other cases, different people might have expertise in different domains, and the service management framework might maintain a list of experts to contact (and/or preferred contact methods for each) to address different types of conditions (e.g., application-related conditions, conditions involving underlying infrastructure, network conditions, and/or the like).

Figure 7:
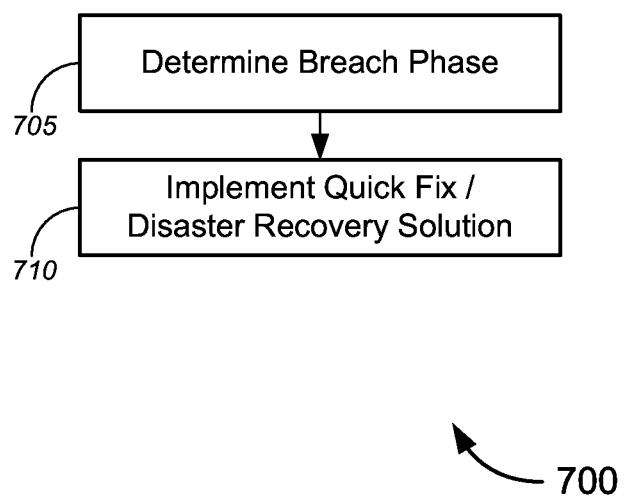

FIG. 7 illustrates a method 700 that can be implemented with regard to a breach phase of the application outage lifecycle. At block 705, the method 700 comprises determining that the managed application has entered into a breach phase. Such a determination can be based on different factors, including without limitation input from the subject matter expert indicating that known troubleshooting techniques have not remedied the problem, continued performance degradation (e.g., approaching the point of complete loss of functionality of some or all components of the managed application), perhaps in spite of subject matter expert intervention, and/or the like. If the system determines that the managed applications into the breech face, the method 700 can include implementing quick fixes and/or disaster recovery solutions, such as those strata above. In some cases, such fixes and/or solutions can be implemented autonomously; in other cases, the solutions might involve participation by the subject matter expert or another person. In any case, the quick fixes and/or disaster recovery solutions might restore at least limited application functionality (e.g. on a backup system, etc.) until full application functionality can be resumed (e.g. after structural changes to the production system, application installation or replacement, and/or the like.)

Figure 8:
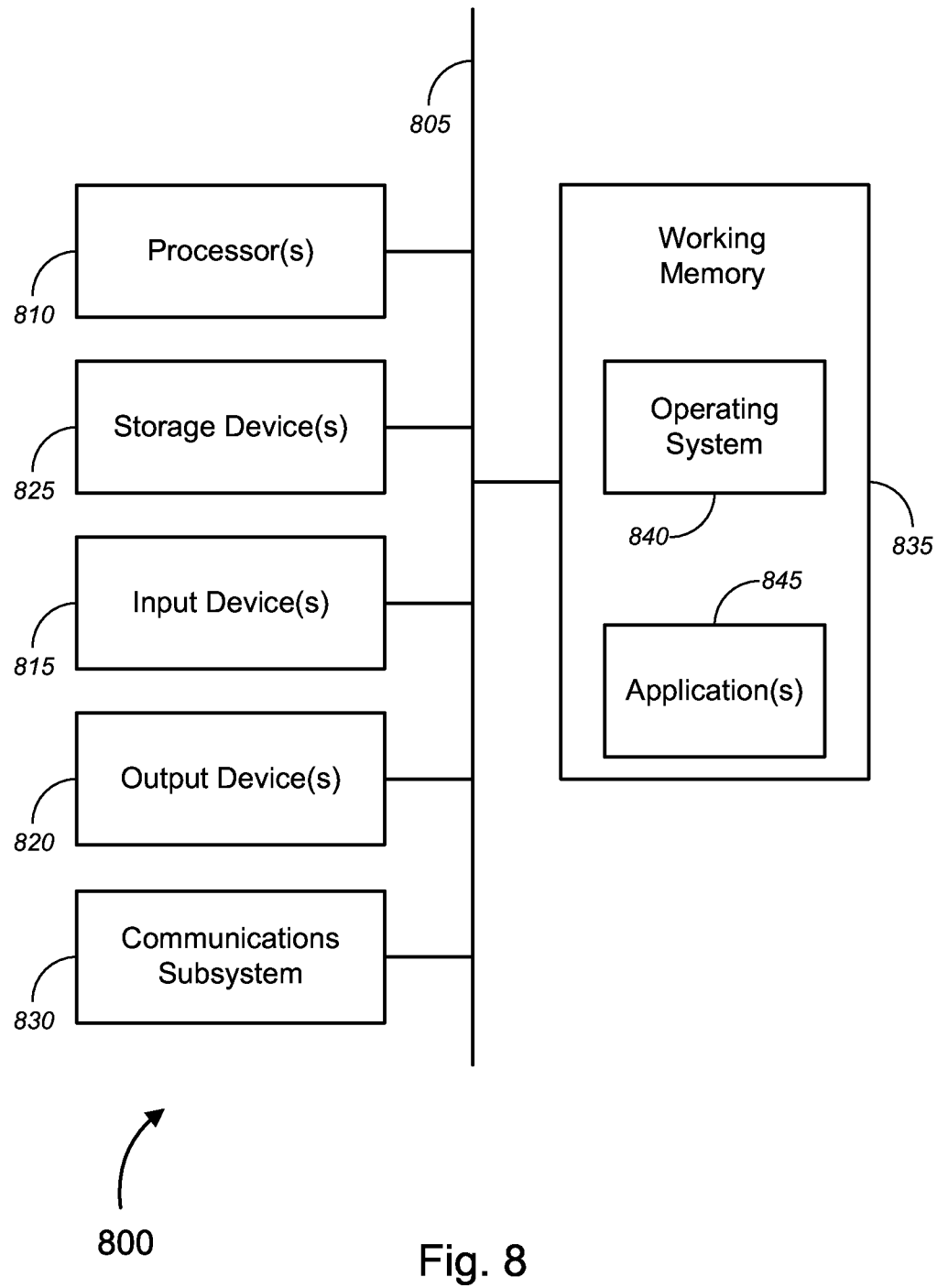
FIG. 8 is a generalized schematic diagram illustrating a computer system, in accordance with various embodiments.

FIG. 8 provides a schematic illustration of one embodiment of a computer system 800 that can perform the methods provided by various other embodiments, as described herein, and/or can function a production system, a service management system, and/or the like. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer systems, and/or with any other devices described herein. In many embodiments, the computer system 800 will further comprise a working memory 835, which can include a RAM or ROM device, as described above.

The computer system 800 also may comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
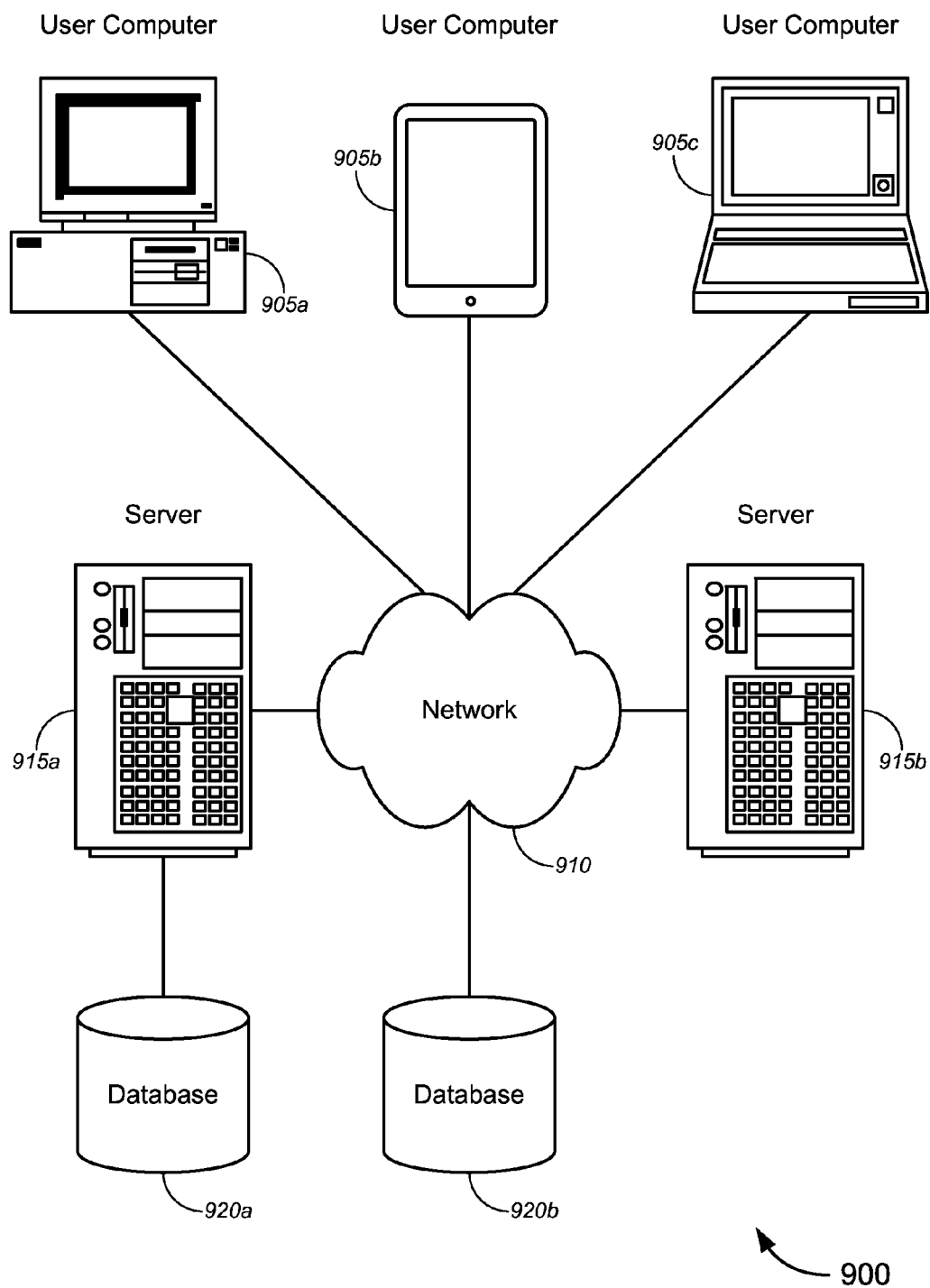
FIG. 9 is a block diagram illustrating a networked system of computers, which can be used in accordance with various embodiments.

As noted above, a set of embodiments comprises systems for providing service management of a software application FIG. 9 illustrates a schematic diagram of a system 900 that can be used in accordance with one set of embodiments. The system 900 can include one or more user computers 905. A user computer 905 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 905 can also have any of a variety of applications, including one or more applications configured to perform methods provided by various embodiments (as described above, for example), as well as one or more office applications, database client and/or server applications, and/or web browser applications. Alternatively, a user computer 905 can be any other electronic device, such as a thin-client computer, Internet-enabled mobile telephone, and/or personal digital assistant, capable of communicating via a network (e.g., the network 910 described below) and/or of displaying and navigating web pages or other types of electronic documents. Although the exemplary system 900 is shown with three user computers 905, any number of user computers can be supported.

Certain embodiments operate in a networked environment, which can include a network 910. The network 910 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 910 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915. Without limitation, any of such applications or services (examples of which are described in detail below) can function as a managed application (i.e., an application managed by the service management frameworks described above with respect to various embodiments) within the scope of this disclosure.

Hence, one of the servers 915a might be a service management system as described above with respect to FIGS. 2A and 2B. Such a system might be implemented on the same system as a managed application (in which case the server 915 might host another server application, as described below, which might be the managed application in various embodiments. Thus, while FIG. 9 depicts different server systems, it should be appreciated that such systems can be consolidated or separate as appropriate to various embodiments.

Another server 915b may be a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention (e.g., to provide a user interface for a managed application, to provide a user interface between the service management framework and a subject matter expert or other service delivery personnel, etc.).

The server computers 915, in some embodiments, might include one or more application servers, which can be configured with one or more applications (e.g., enterprise applications) accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™ IBM™ and the like, which can process requests from clients (including, depending on the configuration, dedicated database clients, API clients, web browsers, etc.) running on a user computer 905 and/or another server 915. In some embodiments, a service management system (or an application server or web server in communication therewith) can create web pages dynamically for displaying the information in accordance with various embodiments, such as dashboard applications, which can display notifications and the like for subject matter experts or other service delivery personnel. Data provided by an such a system may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer 905 and/or server 915.

It should be noted that the functions described with respect to various servers herein (e.g., service management system, application server, database server, web server, file server, etc.) can be performed by a single server and/or a plurality of specialized servers, depending on implementation-specific needs and parameters.

In certain embodiments, the system can include one or more databases 920, which can be used by the managed application(s) (and therefore subject to monitoring and management themselves) and/or can be used to store data produced or managed by the service management system (such as notification databases, knowledgebases, and the like). The location of the database(s) 920 is discretionary: merely by way of example, a database 920*a* might reside on a storage medium local to (and/or resident in) a server 915*a* (and/or a user computer 905). Alternatively, a database 920*b* can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing service management for a software application, the method comprising:
   implementing, with a computer, a service management framework to manage the software application, the service management framework comprising:
   an early warning system;
   a self-healing system; and
   a subject matter expert intervention mechanism;
   monitoring, with the computer, the software application;
   detecting, with the computer, that the software application has encountered deterioration of operation;
   determining, with the computer, which one of a plurality of pre-defined performance deterioration phases into which the software application has entered, the pre-defined performance deterioration phases comprising one of:
   an attenuation phase, in which the function of the software application deviates from at least one baseline metric but still remains generally operational;
   a degeneration phase, characterized by an anomaly in the function of the software application and initialization of the self-healing system;
   a debilitation phase, characterized by partial loss of function in the software application and failure of the self-healing system to repair the function of the software application; and
   a breach phase, characterized by complete loss of function of the software application; and
   based on the determination of the pre-defined performance deterioration phase, performing, with the computer, one or more actions specified by the service management framework.

2. The method of claim 1, wherein the one or more actions specified by the service management framework for the attenuation phase comprise generating one or more automatic alert notifications with the early warning system, in response to detecting that the software application has encountered a condition that indicates the software application has entered the attenuation phase.

3. The method of claim 2, wherein detecting that the software application has encountered a condition that indicates the software application has entered the attenuation phase comprises detecting the condition with a monitoring component that compares one or more application performance statistics with baseline performance statistics.

4. The method of claim 2, wherein the early warning system generates one automatic alert notification each time the computer detects that the software application has encountered a condition that indicates the software application has entered the attenuation phase.

5. The method of claim 1, wherein the one or more actions specified by the service management framework comprise invocation of a self healing system in response to receiving a specified number of automatic alert notifications, the specified number of alert notifications indicating that the software application has entered the degeneration phase.

6. The method of claim 5, wherein the self healing system performs an automated analysis of the detected condition and attempts to implement an automated resolution of the condition.

7. The method of claim 6, wherein the automated analysis comprises behavioral monitoring.

8. The method of claim 6, wherein the automated resolution of the condition comprises implementation of an executor or an exception handler.

9. The method of claim 1, wherein the one or more actions specified by the service management framework comprise automatic notification of a subject matter expert, in response to detecting a condition indicating that the software application has entered the debilitation phase.

10. The method of claim 9, wherein the condition indicating that the software application has entered the debilitation phase comprises a notification from a self healing system that the self healing system attempted to repair an anomaly but was unable to repair the anomaly.

11. The method of claim 9, wherein notification of a subject matter expert comprises displaying a notification in a dashboard display.

12. The method of claim 9, wherein notification of a subject matter expert comprises transmitting a message addressed to the subject matter expert.

13. The method of claim 1, wherein the one or more actions specified by the service management framework comprises implementation of an automated disaster recovery solution, in response to detecting that the software application has encountered the breach phase.

14. The method of claim 13, wherein the automated disaster recovery solution comprises offloading one or more tasks of the software application to a failover application.

15. The method of claim 13, wherein the automated disaster recovery solution comprises automatic recovery of one or more configuration files.

16. The method of claim 1, wherein the service management framework specifies that management of the software application will proceed through the pre-defined performance deterioration phases in a specified order when performance degradation is detected.

17. The method of claim 16, further comprising:
detecting, with the computer, a condition of the software application; and
in response to the detected condition, varying management of the software application by proceeding through the pre-defined performance deterioration phases in an order other than the specified order.

18. An apparatus, comprising:
a non-transitory computer readable medium having encoded thereon a set of instructions executable by one or more computers to perform one or more operations for providing service management for a software application, the set of instructions comprising:
instructions for implementing a service management framework to manage the software application, the service management framework comprising:
an early warning system;
a self-healing system; and
a subject matter expert intervention mechanism;
instructions for monitoring the software application;
instructions for detecting that the software application has encountered deterioration of operation;
instructions for determining one of a plurality of pre-defined performance deterioration phases into which the software application has entered, the pre-defined performance deterioration phases comprising one of:
an attenuation phase, in which the function of the software application deviates from at least one baseline metric but still remains generally operational;
a degeneration phase, characterized by an anomaly in the function of the software application and initialization of the self-healing system;
a debilitation phase, characterized by partial loss of function in the software application and failure of the self-healing system to repair the function of the software application; and
a breach phase, characterized by complete loss of function of the software application; and
instructions for performing, based on the determination of the pre-defined performance deterioration phase, one or more actions specified by the service management framework.

19. A computer system for providing service management for a software application, comprising:
one or more processors; and
a non-transitory computer readable medium in communication with the one or more processors, the computer readable medium having encoded thereon a set of instructions executable by the computer system to perform one or more operations, the set of instructions comprising:
instructions for implementing a service management framework to manage the software application, the service management framework comprising:
an early warning system;
a self-healing system; and
a subject matter expert intervention mechanism;
instructions for monitoring the software application;
instructions for detecting that the software application has encountered deterioration of operation;
instructions for determining one of a plurality of pre-defined performance deterioration phases into which the software application has entered, the pre-defined performance deterioration phases comprising one of:
an attenuation phase, in which the function of the software application deviates from at least one baseline metric but still remains generally operational;
a degeneration phase, characterized by an anomaly in the function of the software application and initialization of the self-healing system;
a debilitation phase, characterized by partial loss of function in the software application and failure of the self-healing system to repair the function of the software application; and
a breach phase, characterized by complete loss of function of the software application; and
instructions for performing, based on the determination of the pre-defined performance deterioration phase, one or more actions specified by the service management framework.

* * * * *